United States Patent
Foskey et al.

(10) Patent No.: US 11,440,652 B2
(45) Date of Patent: Sep. 13, 2022

(54) ALL-FABRIC SPAR FOR AERODYNAMIC COMPONENTS

(71) Applicant: Bell Helicopter Textron Inc., Fort Worth, TX (US)

(72) Inventors: Christopher Edward Foskey, Keller, TX (US); Jared Mark Paulson, Fort Worth, TX (US); Michael Christopher Burnett, Fort Worth, TX (US); Mark Mays, Bedford, TX (US)

(73) Assignee: Textron Innovations Inc., Providence, RI (US)

( * ) Notice: Subject to any disclaimer, the term of this patent is extended or adjusted under 35 U.S.C. 154(b) by 348 days.

(21) Appl. No.: 16/056,610

(22) Filed: Aug. 7, 2018

(65) Prior Publication Data

US 2020/0047879 A1 Feb. 13, 2020

(51) Int. Cl.
*B29C 70/30* (2006.01)
*B64C 27/473* (2006.01)
*B29C 70/54* (2006.01)
*B32B 1/08* (2006.01)
*B32B 5/12* (2006.01)

(Continued)

(52) U.S. Cl.
CPC .......... *B64C 27/473* (2013.01); *B29C 53/568* (2013.01); *B29C 70/30* (2013.01); *B29C 70/32* (2013.01); *B29C 70/54* (2013.01); *B32B 1/08* (2013.01); *B32B 5/024* (2013.01); *B32B 5/12* (2013.01); *B32B 5/26* (2013.01); *B32B 37/182* (2013.01); *B32B 38/1808* (2013.01); *B64C 11/26* (2013.01); *B29K 2105/089* (2013.01); *B29K 2105/0845* (2013.01);

(Continued)

(58) Field of Classification Search
CPC ........ B29C 70/30; B29C 70/228; B29C 70/22
See application file for complete search history.

(56) References Cited

U.S. PATENT DOCUMENTS 4,475,976 A * 10/1984 Mittelstadt ............ B29C 70/342
100/211
4,622,254 A * 11/1986 Nishimura ............ B29C 70/228
428/102

(Continued)

FOREIGN PATENT DOCUMENTS

GB 2040790 * 9/1980 ............. B29C 53/60

OTHER PUBLICATIONS

Banks-Sills, L., C. Ishbir, V. Fourman, L. Rogel, R. Eliasi, Interface fracture toughness of a multi-directional woven composite, Int. J. Fract., vol. 182 (2013), pp. 187-207. (Year: 2013).*

*Primary Examiner* — Matthew J Daniels
(74) *Attorney, Agent, or Firm* — Fogarty LLP

(57) ABSTRACT

Embodiments are directed to systems and methods for creating a tubular composite structure. In one embodiment, a device comprises multiple layers of cured composite fabric bonded together to form a tubular composite structure, wherein alternating groups of the multiple layers comprise on-axis fabric and off-axis fabric. The tubular composite structure may form a spar for an aerodynamic component. The composite fabric may comprise one or more of carbon, fiberglass, or other composite materials, or a combination of materials. One or more stacks of the fabric wrap completely around the tubular composite structure, and other stacks of fabric may not wrap completely around the tubular composite structure.

18 Claims, 8 Drawing Sheets

(51) Int. Cl.
*B32B 5/02* (2006.01)
*B32B 5/26* (2006.01)
*B32B 37/18* (2006.01)
*B32B 38/18* (2006.01)
*B29C 70/32* (2006.01)
*B29C 53/56* (2006.01)
*B64C 11/26* (2006.01)
*B29K 105/08* (2006.01)
*B29K 105/24* (2006.01)
*B29L 31/08* (2006.01)

(52) U.S. Cl.
CPC ..... *B29K 2105/24* (2013.01); *B29L 2031/082* (2013.01); *B32B 2260/023* (2013.01); *B32B 2260/046* (2013.01); *B32B 2262/101* (2013.01); *B32B 2262/106* (2013.01); *B32B 2305/076* (2013.01); *B32B 2305/188* (2013.01); *B32B 2305/72* (2013.01); *B32B 2313/04* (2013.01); *B32B 2315/085* (2013.01); *B32B 2603/00* (2013.01); *B64C 2027/4736* (2013.01)

(56) References Cited

U.S. PATENT DOCUMENTS 8,883,060 B2 * 11/2014 Nakamura .............. B29C 70/32
264/258
2014/0265050 A1 * 9/2014 Gingras ................. B29C 43/24
264/510

* cited by examiner

ALL-FABRIC SPAR FOR AERODYNAMIC COMPONENTS

BACKGROUND

Composite assemblies are created by laying up an assembly of uncured details and material. This typically consists of laying dry fabric layers ("plies") by hand to create a laminate stack. Resin is then applied to the dry plies after layup is complete. Alternatively, "wet" composite plies that have resin built in may be used in the layup. Composite fabrication usually involves some form of mold tool to shape the plies and resin. A mold tool is required to give the unformed resin/fiber combination its shape prior to and during cure. Once the layup is complete, the composite is cured. The cure can be accelerated by applying heat and pressure to the composite layup.

A composite assembly may be used as a structural member for an aircraft component, for example. These structural members are often referred to as a "spar," and they may extend the axial length of a structure to provide support against loads applied on the structure. In the case of an aerodynamic component, such as propellers, rotor blades, and wings, for example, the spar may support both the weight of the aerodynamic component and any aerodynamic loads applied to the aerodynamic component, such as lift and drag forces. A rotor blade spar also typically has a highly tuned structural design due to the dynamic effects of a rotating system. The spar is the primary structural member or backbone of many aircraft components. Some existing spars are formed from layers of unidirectional tape.

In existing manufacturing processes, a spar may be formed using a composite preform that is cured prior to assembly with the other components of the structure, such as skin assemblies in the case of composite blades. During this curing process, an inflatable bladder may be disposed within the uncured spar and expanded to help compact the layers of preformed composite material and remove any excess air bubbles or other voids included in the preform as the spar is cured at an elevated temperature within a precision mold. Once cured, the other components or details of the composite assembly are assembled with the spar. For instance, in the case of a rotor blade, outer skins and a leading edge are assembled with the spar and then bonded in a subsequent curing process.

SUMMARY

Embodiments are directed to systems and methods for creating a tubular composite structure using composite fabrics. The tubular composite structure has a spanwise axis. An on-axis fabric is used in the structure and comprises a first set of fibers that are oriented generally parallel to the spanwise axis and a second set of fibers that are oriented generally orthogonal to the spanwise axis. An off-axis fabric is also used in the structure and comprises a first set of fibers that are oriented at angle of 15-degrees to 75-degrees relative to the spanwise axis and a second set of fibers that are oriented generally orthogonal to the first set of fibers in the off-axis fabric.

In one embodiment, a device comprises multiple layers of cured composite fabric bonded together to form a tubular composite structure, wherein alternating groups of the multiple layers comprise on-axis fabric and off-axis woven fabric. The tubular composite structure may form a spar for an aerodynamic component. The composite fabric may comprise one or more of carbon, fiberglass, or other composite materials, or a combination of materials. One or more stacks of the fabric may wrap completely around the tubular composite structure, and other stacks of fabric may not wrap completely around the tubular composite structure.

The on-axis fabric and the off-axis fabric may comprise the same composite material, wherein the off-axis fabric is rotated with respect to the on-axis fabric. The alternating groups of the multiple layers may comprise stacks of either on-axis fabric or off-axis fabric. The on-axis fabric may comprise a first set of fibers oriented in a first direction and a second set of fibers oriented generally orthogonal to the first direction, such as 0-degree and 90-degree fibers. The off-axis fabric may comprise a first set of fibers that are oriented at an angle relative to the first set of fibers in the on-axis fabric and a second set of fibers oriented generally orthogonal to the first set of fibers in the off-axis fabric, such as −45-degree and 45-degree fibers; however, the angle may be selected from 15-degrees to 75 degrees.

The tubular composite structure has a spanwise axis, and the on-axis fabric comprises a first set of fibers oriented generally parallel to the spanwise axis. The on-axis fabric comprises a second set of fibers oriented generally orthogonal to the spanwise axis. The off-axis fabric comprises a first set of fibers oriented at angle of 15-degrees to 75-degrees relative to the spanwise axis, and a second set of fibers oriented generally orthogonal to the first set of fibers in the off-axis fabric.

In another embodiment, a method for manufacturing a tubular composite structure comprises laying up a first stack of composite fabric layers around a mandrel or tool, wherein the layers in the first stack comprise a fabric having a first axis of orientation, laying up a second stack of composite fabric layers around the first stack, wherein the layers in the second stack comprise a fabric having a second axis of orientation, and curing the first and second stacks of composite fabric layers to form the tubular composite structure.

The method may further comprise laying up additional stacks of composite fabric on top of the first and second stacks and around the mandrel or tool, wherein the additional stacks comprise stacks with fabric having a first axis of orientation alternating with stacks having a second axis of orientation. The method may further comprise laying up limited stacks of composite fabric interleaved with the additional stacks of composite fabric, wherein the limited stacks of composite fabric do not wrap completely around the mandrel or tool.

The tubular composite structure created by the method may form a spar for an aerodynamic component. The composite fabric may comprise one or more of carbon, fiberglass, and/or other composite materials or a combination of materials.

The on-axis fabric and the off-axis fabric may comprise the same composite material, wherein the off-axis fabric is rotated with respect to the on-axis fabric. The on-axis fabric used in the method may comprise a first set of fibers oriented in a first direction, and the on-axis fabric further comprises a second set of fibers oriented generally orthogonal to the first direction. The off-axis fabric used in the method may comprise a third set of fibers that are at an angle to the first set of fibers in the on-axis fabric, and a fourth set of fibers oriented generally orthogonal to the third set of fibers in the off-axis fabric. The angle may be selected from 15-degrees to 75 degrees, for example.

BRIEF DESCRIPTION OF THE DRAWINGS

Figure 1:
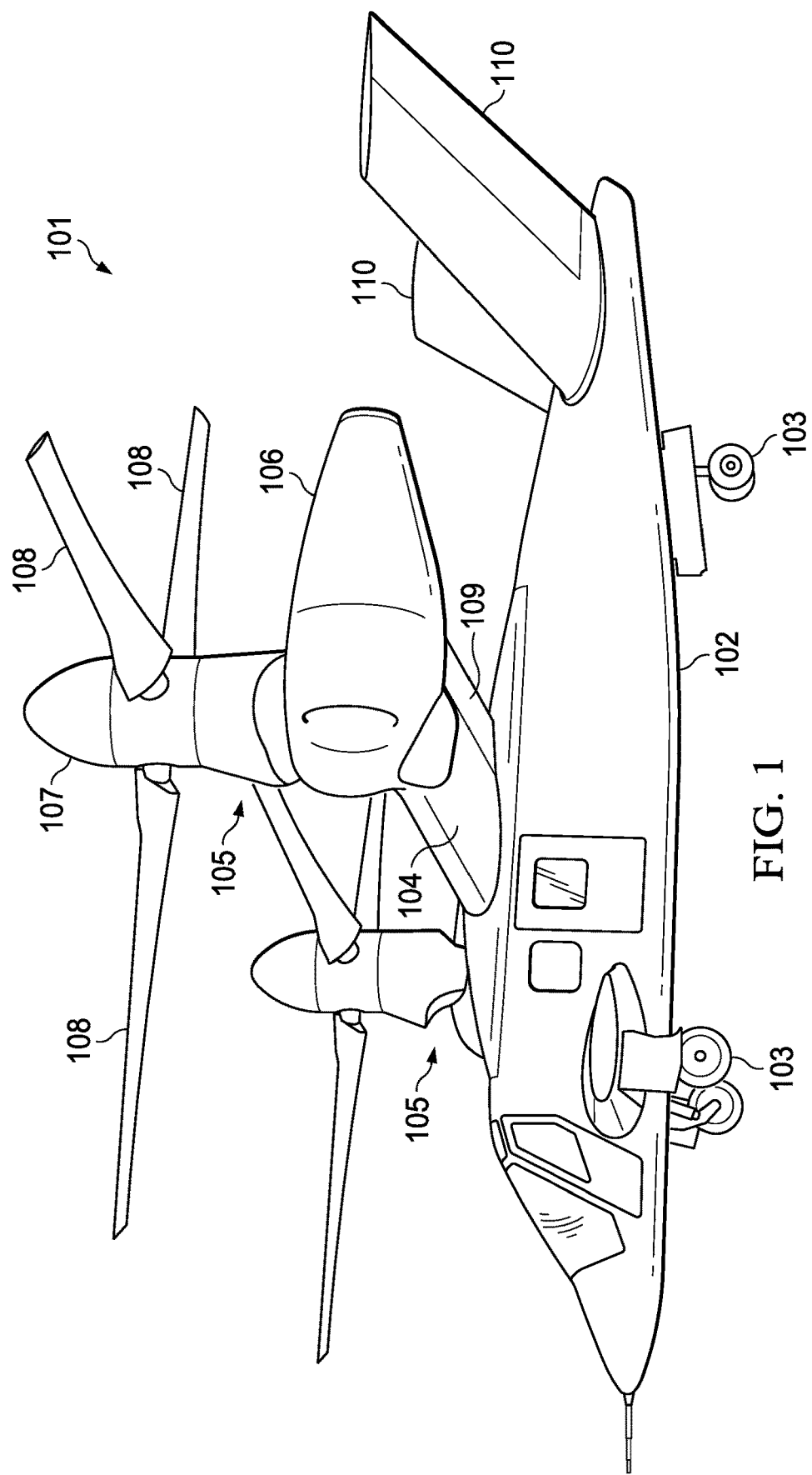

Having thus described the invention in general terms, reference will now be made to the accompanying drawings, which are not necessarily drawn to scale, and wherein:

FIG. 1 illustrates an example aircraft that can be used with certain embodiments of the disclosure.

Figure 2A:
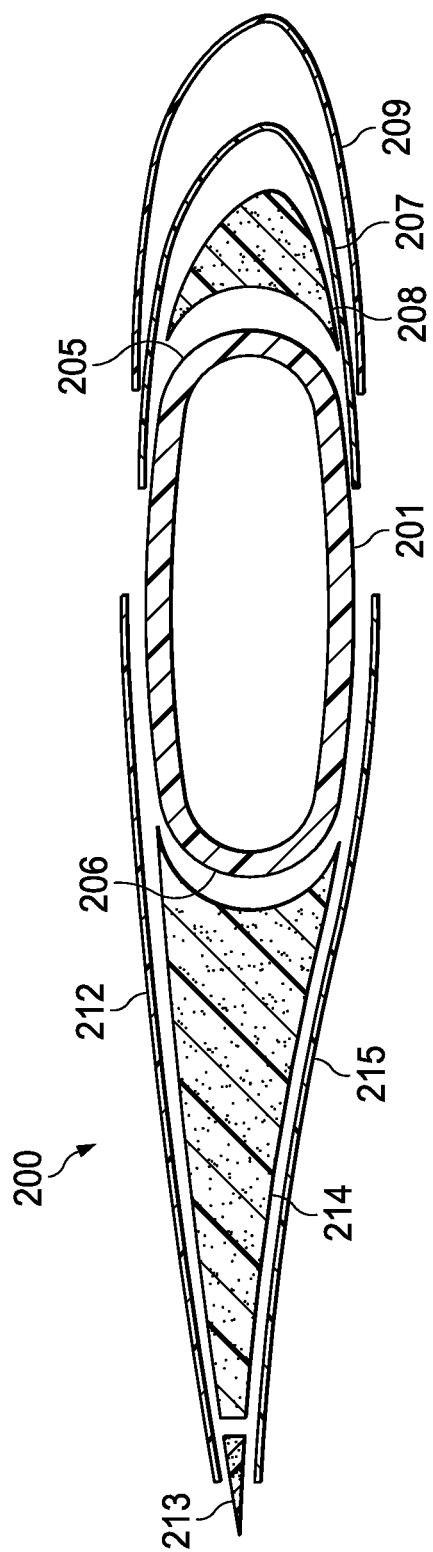

FIG. 2A is an exploded cross-sectional view of a proprotor blade assembly in accordance with embodiments of the present disclosure.

Figure 2B:
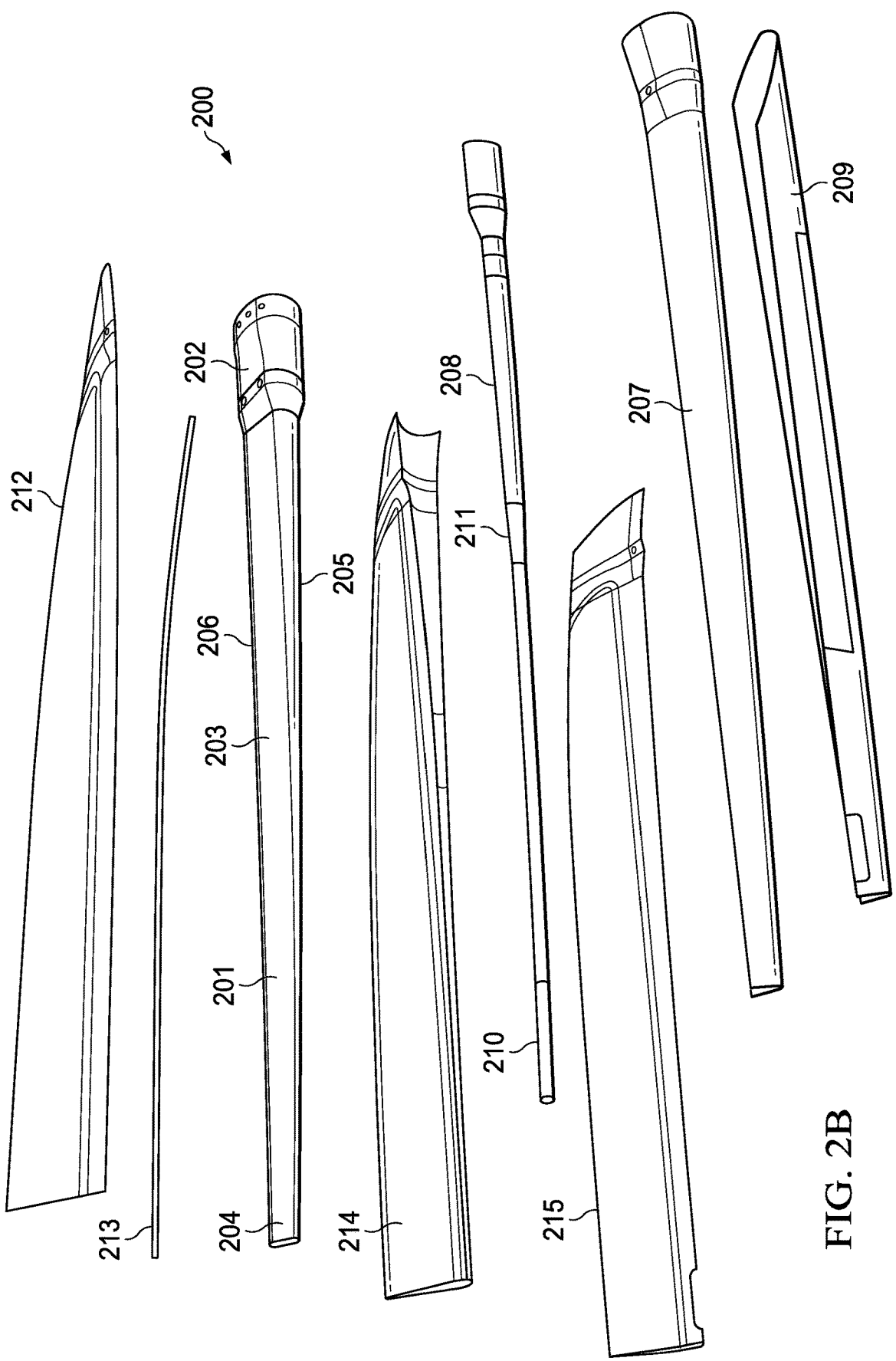

FIG. 2B is an exploded view of a proprotor blade assembly in accordance with embodiments of the present disclosure.

Figure 3:
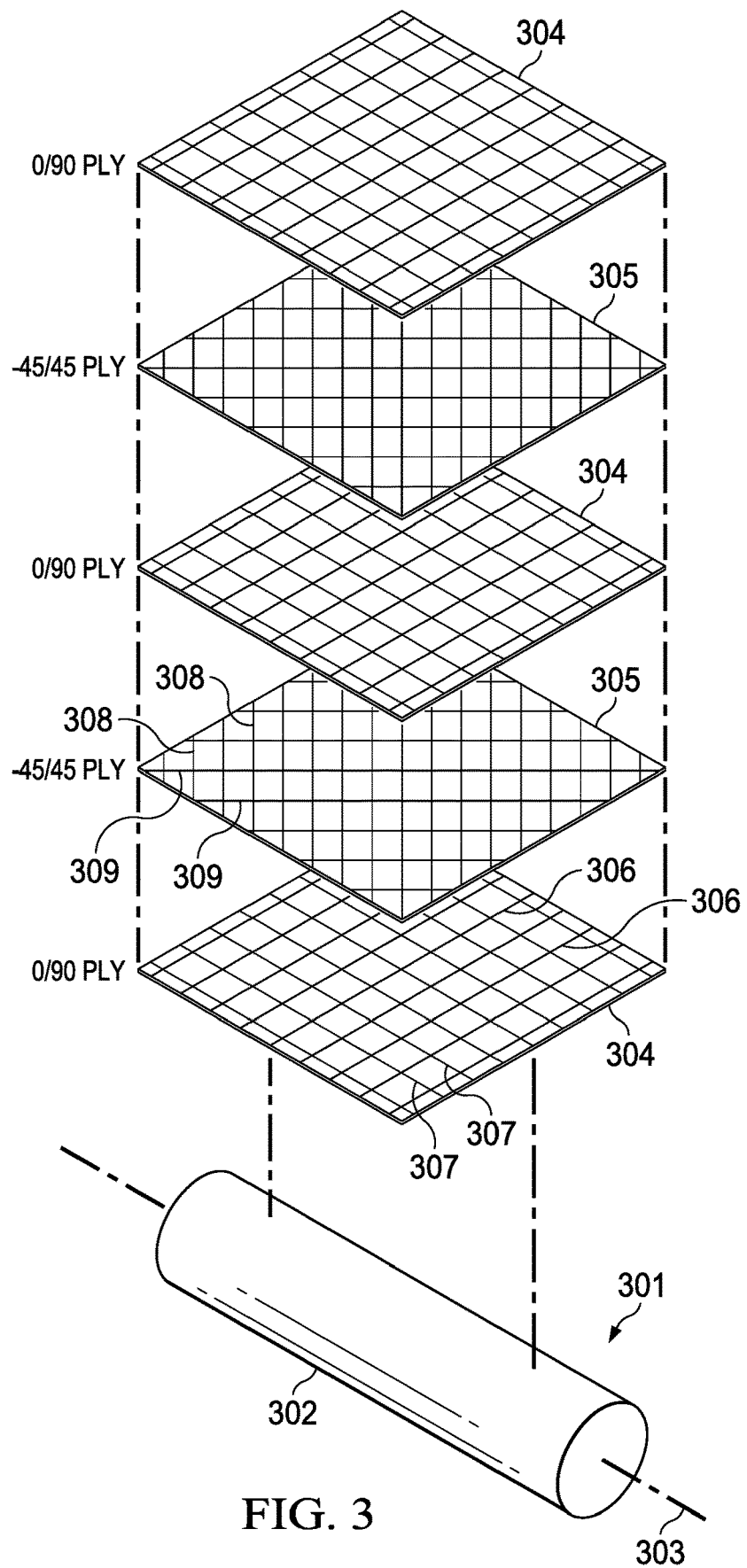

FIG. 3 illustrates laying up composite fabric on a mandrel according to one embodiment.

Figure 4:
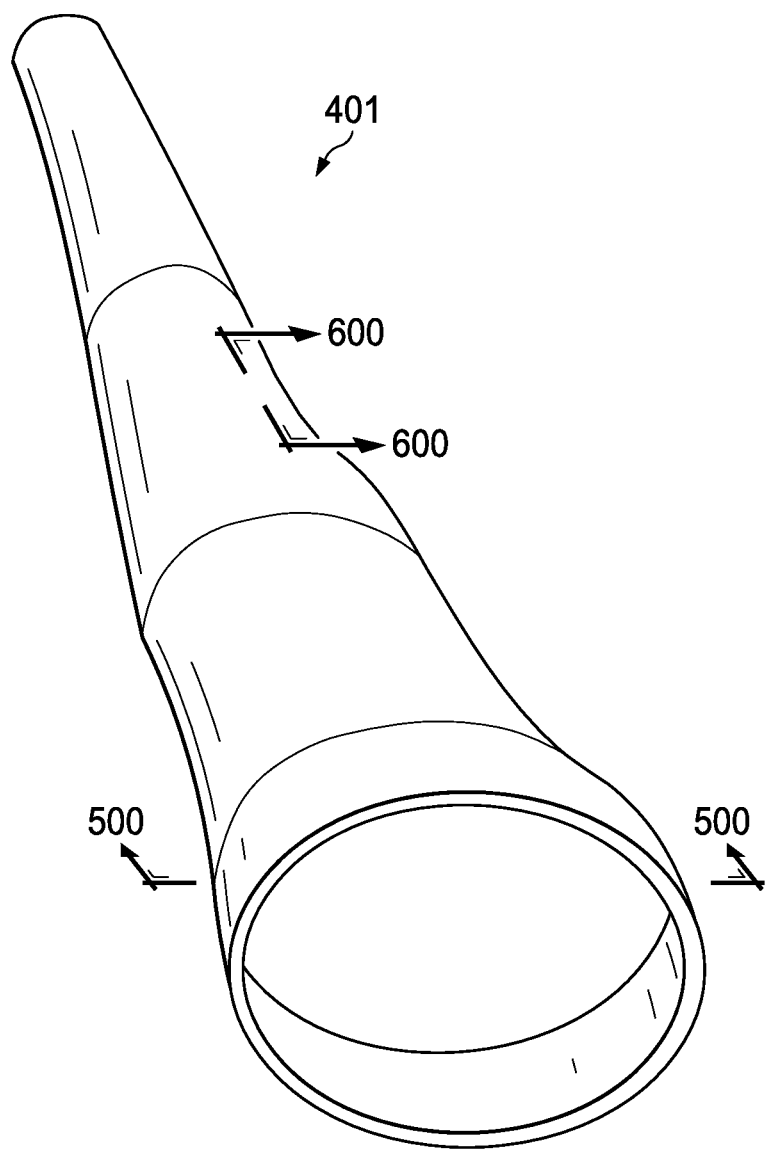

FIG. 4 illustrates a spar created by the process shown in FIG. 3.

Figure 5A:
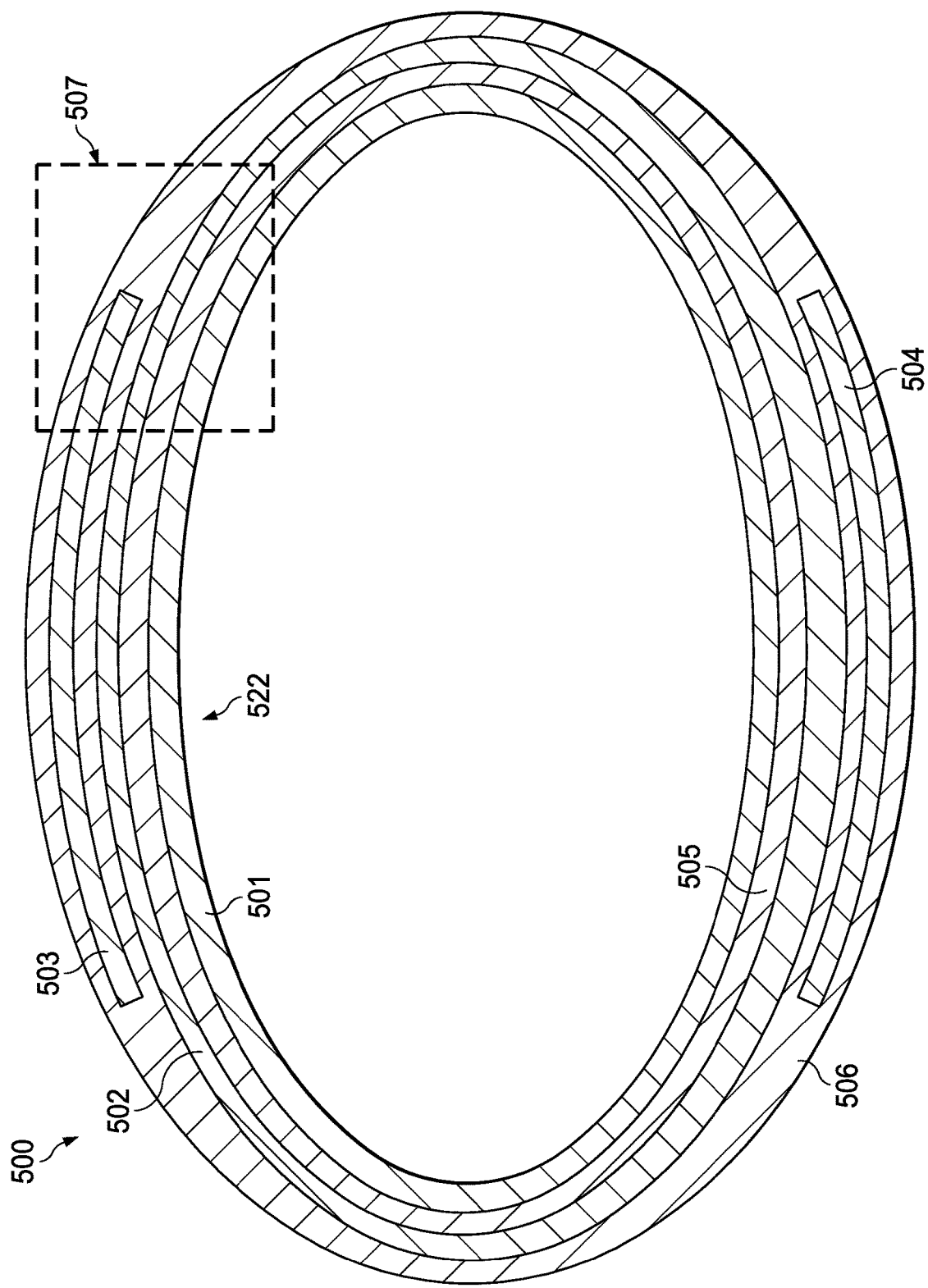

FIG. 5A is a cross-section view of a spar showing a layup sequence of different fabric layers according to one embodiment.

Figure 5B:
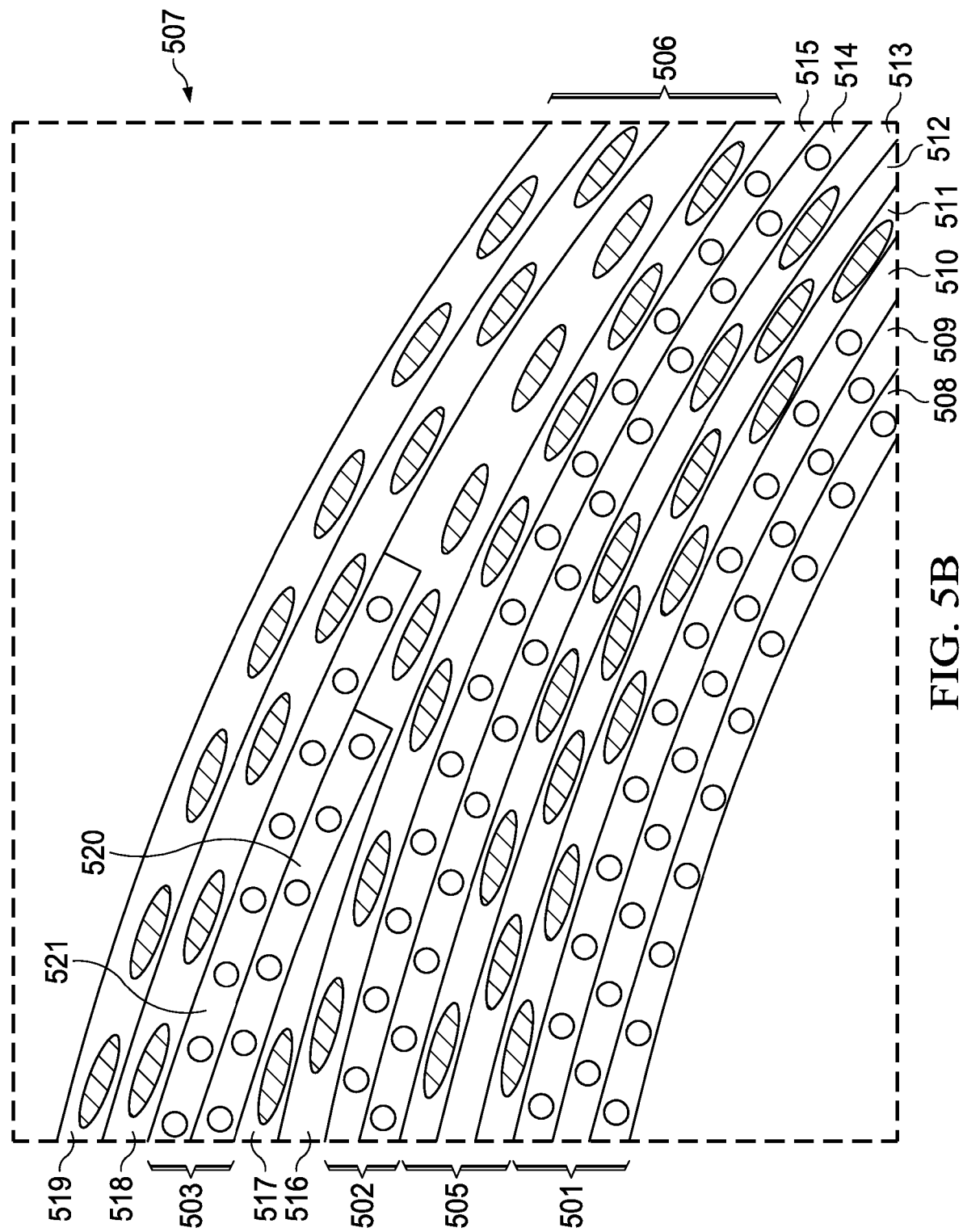

FIG. 5B is an expanded view of a region in FIG. 5A further illustrating how layers of 0/90 ply fabric and −45/45 ply fabric are stacked during layup to create the spar.

Figure 6:
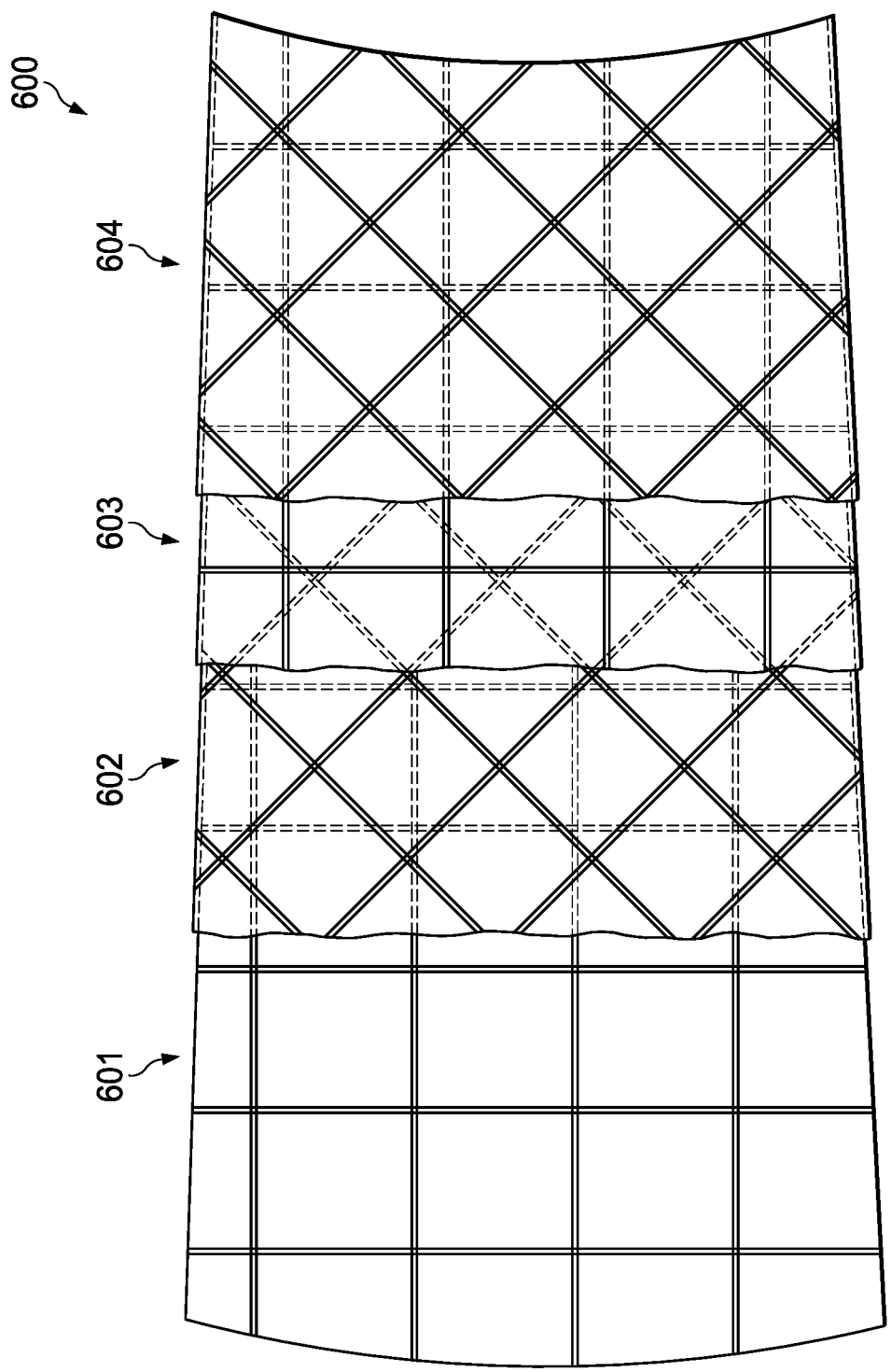

FIG. 6 is a cut-away sideview of an area in FIG. 4 further illustrating the fabric fibers within the various stacks of fabric.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Embodiments are directed toward providing a high-quality composite part using a process that lowers the risk of manufacturing defects and reduces the manufacturing time. A tubular composite assembly may be laid up in pieces that are later combined, which provides both quality improvements and potential manufacture time reductions. This provides overall cost savings and allows for faster production rates.

FIG. 1. illustrates an aircraft 101. Certain embodiments of the disclosure may be used with an aircraft, such as aircraft 101. However, aircraft 101 is used merely for illustration purposes. It will be understood that composite materials manufactured using the embodiments disclosed herein may be used with any aircraft, including fixed wing, rotorcraft, commercial, military, or civilian aircraft, or any other non-aircraft structure requiring a hollow or tubular construction. Embodiments of the present disclosure are not limited to any particular setting or application, and embodiments can be used with a rotor system in any setting or application such as with other aircraft, vehicles, or equipment. Certain embodiments of the composite assemblies and methods of forming such disclosed herein may be used for any application involving a composite, aerodynamically shaped object. For example, some embodiments of the composite assemblies disclosed herein may be used for the rotors, propellers, wings, or control surfaces of an aircraft.

Aircraft 101 may include fuselage 102, landing gear 103, and wings 104. A propulsion system 105 is positioned on the ends of wings 104. Each propulsion system 105 includes an engine 106 and a proprotor 107 with a plurality of rotor blades 108. Engine 106 rotates proprotor 107 and blades 108. Proprotor 107 may include a control system for selectively controlling the pitch of each blade 108 to control the direction, thrust, and lift of aircraft 101. Although FIG. 1 shows aircraft 101 in a helicopter mode wherein proprotors 107 are positioned substantially vertical to provide a lifting thrust. It will be understood that in other embodiments, aircraft 101 may operate in an airplane mode wherein proprotors 107 are positioned substantially horizontal to provide a forward thrust. Proprotors 107 may also move between the vertical and horizontal positions during flight as aircraft 101 transitions between a helicopter mode and an airplane mode. Wings 104 may provide lift to aircraft 101 in certain flight modes (e.g., during forward flight) in addition to supporting propulsion systems 105. Control surfaces 109 on wing 104 and/or control surfaces 110 are used to adjust the attitude of aircraft 101 around the pitch, roll, and yaw axes while in airplane mode. Control surfaces 109 and 110 may be, for example, ailerons, flaps, slats, spoilers, elevators, or rudders. Wings 104, rotor blades 108, and/or control surfaces 109, 110 may be composite assemblies each comprising a spar and a set of upper and lower skins that extend along the spar. In some embodiments, the composite assemblies may have an upper core, a lower core, and a septum support layer extending between the upper and lower cores.

Referring to FIGS. 2A and 2B, exploded views of a proprotor blade assembly 200 is shown in accordance with embodiments of the present disclosure. Proprotor blade assembly 200 includes a spar 201 that is the main structural member of proprotor blade assembly 200 designed to carry the primary centrifugal and bending loads of proprotor blade assembly 200. Spar 201 has a root section 202, a main section 203, a tip section 204, a leading edge 205 and a trailing edge 206. As illustrated, spar 201 has a root-to-tip twist on the order of about 30 degrees to about 40 degrees and preferably about 35 degrees. Spar 201 has a generally oval cross section along at least main section 203 of spar 201 such that the interior of spar 201 has simple geometric surfaces with smooth transitions between the forward wall 205, the upper and lower walls and the aft wall 206. Spar 201 is preferably a monolithic structure formed using a woven fabric construction process having a manual or automated layup of a plurality of composite pre-impregnated ("prepreg") woven fabric layers, such as fiberglass fabric, carbon fabric, and combinations thereof, positioned over one or more mandrels having simple geometric surfaces with smooth transitions. After curing, the material layers form a high strength, lightweight solid composite member.

A discrete sheath 207, an optional foam filler 208, and an abrasion resistant strip 209 form the leading edge of proprotor blade assembly 200. As illustrated, sheath 207 has a generally C-shaped cross section and is securely attached spanwise to spar 201 using adhesive, curing or other suitable coupling technique. Sheath 207 is preferably a monolithic structure formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form a high strength, lightweight solid composite member. Sheath 207 serves as a structural member of proprotor blade assembly 200 including providing shear stiffness to proprotor blade assembly 200. In addition, sheath 207 augments the forward bias of spar 201 to enhance the forward bias of proprotor blade assembly 200. As illustrated, foam filler 208 is disposed spanwise between spar 201 and sheath 207. Foam filler 208 is sized and shaped to support sheath 207 at the proper position relative to spar 201. Foam filler 208 may include one or more lead tuning weights, such as tip tuning weight 210 and mid span tuning weight 211. It should be noted that in certain embodiments, foam filler 208 may be omitted leaving a gap between sheath 207 and spar 201. Abrasion resistant strip 209 is disposed spanwise on the leading edge of sheath 207 and is securely attached thereto using adhesive or other suitable coupling technique. Abrasion resistant strip 209 may be formed from a metal such as stainless steel and is designed to protect the other components of proprotor blade assembly 200 from erosion and impacts.

Upper skin 212, wedge member 213, core 214 and lower skin 215 form the afterbody of proprotor blade assembly 200. Upper skin 212 and lower skin 215 are preferably monolithic structures formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form high strength, lightweight solid composite members. Upper skin 212 and lower skin 215 serve as structural members of proprotor blade assembly 200 and are securely attached spanwise to spar 201 using adhesive, curing or other suitable coupling technique. Core 214 may be in the form of a nomex honeycomb structure disposed spanwise along trailing edge 206 of spar 201. Core 214 provides stability, compression resistance and shear transfer between upper skin 212 and lower skin 215. Wedge member 213 forms the trailing edge of proprotor blade assembly 200. Wedge member 213 is preferably a monolithic structure formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form a high strength, lightweight solid composite member. Wedge member 213 serves as a structural member of proprotor blade assembly 200 including providing stiffness to proprotor blade assembly 200. Also shown in FIGS. 3 and 5, proprotor blade assembly 200 includes a pitch horn 70. Pitch horn 70 is preferably formed from metal such as machined aluminum. In the illustrated embodiment, pitch horn 70 is securably coupled to spar 201 with a plurality of bolts. In operation, pitch horn 70 is connected to the control system of tiltrotor aircraft 10 enabling the pilot to selectively control the pitch of proprotor blade assembly 200.

Spar 201 may comprise two or more layers of uncured laminate fabric. Each fabric layer is formed from fiberglass or carbon fiber composite material. However, in other embodiments the fabric layers may comprise other types of composite materials. In some existing assemblies, spar 201 is manufactured using layers of unidirectional tape or fiberglass roving. The majority of the load in a spar extends lengthwise along the spar and unidirectional tape provides these requirements. Existing spars may use some off-axis tape, such as fibers running at 45 or 90-degrees relative to the length, for tuning or support. However, in many existing spars, there is not a structural need for woven material or fabric having a large number of off-axis fibers.

In embodiments of the disclosure, spar 201 is manufactured using only fabric components. An all-fabric spar provides advantages over existing spars, such as improved fatigue and damage capabilities. Additionally, existing unidirectional carbon or fiberglass tape does not easily drape across complex surfaces on a spar mandrel or lay-up tool. Instead, unidirectional tape as used in prior manufacturing techniques tends to conform easily only along one dimension. On the other hand, because fabric material has fibers woven in generally orthogonal directions—i.e., both lengthwise and crosswise fibers or roving, the fibers in fabric have a greater ability to slide over one another, which allows the fabric to drape over two directions of curvature at that same time. Since the fabric weaving process partially "buckles" every fiber as it passes over and under adjacent fibers, the resultant woven array behaves in a softer manner from a handling perspective and is more conformable to complex curvature than an equivalent tape ply of all single-direction unwoven fiber.

A typical spar manufacturing process uses a male mandrel or form. Composite material may often be laid up by hand on the mandrel and then cured to form a spar. The male mandrel typically has a complex surface to generate effective bond line surfaces and to create the overall profile of the spar. For example, the mandrel may include flat spots and/or areas with rounded corners that are not easily covered using unidirectional tape. Ease of hand layup is notably enhanced on the mandrel because of the improved ability to drape and/or stretch across the complex surface areas compared to tape. As a result, manufacturing lay-up is significantly less troublesome using fabric compared to tape, which saves time and cost during manufacture.

An all-fabric spar may have excess weight due to the off-axis fibers in the fabric, which may exist in excess of the design requirements for structural stiffness. However, weight is often added to existing spars depending upon the application. Accordingly, the extra weight added by the off-axis fibers in fabric provide this extra weight inherently in the all-fabric spar construction, which can be useful in dynamically tuning the spar for some applications.

FIG. 3 illustrates laying up composite fabric on a mandrel according to one embodiment. A mandrel tool 301 provides a surface on which to lay up the composite fabric. The surface 302 of mandrel 301 is designed to give the resulting spar a desired shape after composite fabric has been laid up and cured. Mandrel has an axis 303 extending along its length corresponding to the span of the component that will be built around the resulting spar. Multiple layers of composite fabric 304, 305 are around surface 302 of mandrel 301. The composite fabric layers alternate between 0/90 ply fabric 304 and −45/45 ply fabric 305. Although only single layers of each fabric type are shown as interleaved in FIG. 3, it will be understood that multiple layers of one type of fabric may be laid up on mandrel 301 before adding additional layers of another type of fabric. For example, multiple layers of 0/90 ply fabric 304 may be laid up on mandrel 301 before switching to lay up multiple layers of −45/45 ply fabric 305 and so on.

Fabric 304 is draped on the surface of mandrel 301 so that fibers 306 are oriented along the span axis 303 on mandrel 301. Fibers 306 (e.g., carbon or glass filaments, fibers, or roving) that are laid out roughly parallel to span axis 303 and are referred to herein as 0-degree fibers. Fabric 304 has another set of fibers 307 that are generally oriented perpendicular to fibers 306 and to the span axis 303. Fibers 306 and 307 are interwoven. Fibers 307 are referred to herein as 90-degree fibers. The 0-degree fibers within the woven 0/90 ply 305 will carry most of the structural load in the final spar, while the 90-degree fibers serve to enhance the drapability of the ply during manufacture. Depending upon the spar design, one or more layers of 0/90 fabric 304 are laid up on the mandrel 301.

After the initial layers of 0/90 ply fabric 304 have been applied, then one or more layers of −45/45 ply fabric 305 may be laid up. Fabric 305 has two sets of fibers 308, 309 that are roughly orthogonal to each other and are interwoven. Fabric 305 is laid up so that fibers 308, 309 are oriented generally plus or minus 45 degrees from span axis 303. Fabric 305 acts as a torque wrap layer around the lower fabric layers. Additional alternating layers of 0/90 ply fabric 304 and −45/45 ply fabric 305 may be laid up as required to achieve a desired thickness around the shape defined by mandrel 301.

Composite fabric layers 304 and 305 may comprise a pre-impregnated ("pre-preg") material having either a thermoplastic or thermoset resin, for example. Once all fabric layers 304 and 305 have been applied, then heat and/or pressure is applied to cure the spar component. After cure is complete, the newly manufactured spar is removed from mandrel 301. Although the example embodiments described herein refer to manufacture of a spar component, it will be understood that layered fabric having orthogonal fibers offset in a 0/90 and −45/45 pattern can be used to manufacture any tubular structure or component. The 0/90 ply fabric 304 and −45/45 ply fabric 305 may be two different materials, such as sourced from two different rolls of composite fabric. Alternatively, 0/90 ply fabric 304 and −45/45 ply fabric 305 may be the same material, such as from the same source roll, but the −45/45 ply fabric 305 is rotated off-axis (e.g., by 45-degrees, or some other angle) when applied.

Moreover, although the example illustrated in FIG. 3 shows fabric layer 305 as oriented at plus and minus 45-degrees from the span axis 303, it will be understood that in other embodiments a torque wrap fabric layer 305 may be oriented at other angles relative to the span axis 303. For example, fabric layers 305 may be oriented so that a first set of fibers (e.g., fibers 308) are oriented between 15- and 75-degrees off span axis 303. The other set of fibers (e.g., fibers 309) will be oriented with a 90-degree rotation relative to the first set of fibers. In further embodiments, different fabric layers 305 may be oriented at varying rotations relative to the span axis 303. For example, in some fabric layers 305, fibers 308 are oriented at 45-degrees relative to span axis 303, in other fabric layers 305, fibers 308 are oriented at 15-degrees relative to span axis 303, and in still other fabric layers 305, fibers 308 are oriented at 75-degrees relative to span axis 303, etc.

FIG. 4 illustrates a spar 401 created by the process described above with respect to FIG. 3. Spar 401 comprises multiple fabric layers that have been cured and removed from mandrel 301. Spar 401 may form the backbone of an aerodynamic component, such as a rotor, propeller, wing, control surface, or the like as shown in FIG. 2 as component 202. Spar 401 comprises all fabric in both the spanwise and chordwise/off-axis orientation in interposed packs or layers to achieves the dynamic and structural requirements for an aerodynamic component. The use of fabric material provides for significantly improved material handling during layup versus tape, which is used in prior spar manufacturing.

Spar 401 is formed by laying up uncured pre-preg woven fabric over contoured surfaces, which is far less labor intensive than the layup of anisotropically stiff unidirectional tape. Damage tolerance and fatigue resistant properties are also improved in all-fabric spar 401 due to the incorporation of in-plane, off-axis fibers by nature of the woven material. This weave of fibers in the fabric acts as a crack arrestor and a structural net that allows for strains in spar 401 to diffuse around flaws and fiber disruptions that are caused by manufacturing flaws or battle damage, for example. Since each woven fabric ply incorporates a full 90-degree off-axis fiber for each primary axis fiber, the interlaminar shear forces are more evenly distributed without adding discrete off-axis fiber ply layers. Also, by eliminating additional unidirectional off-axis tape, spar 401 is improved by reducing bulk, removing potential ply compaction issues, and decreasing the likelihood of unidirectional fiber distortion.

FIG. 5A is a cross-section view 500 of spar 401 in FIG. 4. Cross-section 500 illustrates the layup sequence of different stacks of on-axis (i.e., 0/90 ply) fabric 501-504 and off-axis (e.g., −45/45 ply) fabric 505-506. Some fabric stacks 501-502, 505-506 may be circumferentially wrapped all the way around the spar. Other fabric stacks 503-504 are only present in certain areas, such as to reinforce high-stress regions of the spar and/or to shape corners or other features. Each stack 501-506 may comprise a plurality of individual layers of on-axis or off-axis fabric to achieve a desired strength, thickness, flexibility, etc. It will be understood that in other embodiments any number of stacks may be used in the design of a particular spar.

FIG. 5B is an expanded view of region 507 in FIG. 5A illustrating individual layers within stacks of 0/90 ply fabric 501-503 and stacks of −45/45 ply fabric 505-506 to create the spar. For example, individual layers 508-510 in stack 501 may comprise a 0/90 ply or on-axis woven fabric that has one set of fibers or roving oriented along the axis of the spar. The next stack 505 has individual layers 511-513 that comprise a −45/45 ply or off-axis woven fabric that is oriented at approximately a 45-degree angle to the spar axis. It will be understood that FIGS. 5A and 5B are not to scale in order to illustrate the different layers for an example embodiment. Additionally, it will be understood that any number of layers may be used within different stacks depending upon the design of a particular spar.

Stack 502 is laid up on top of stack 505 and has individual layers 514-515, which comprise more layers of the 0/90 ply or on-axis woven fabric having one set of fibers or roving oriented along the axis of the spar. Stack 506 is laid up on top of stack 502 and has individual layers 516-519, which comprise more layers of the −45/45 ply or off-axis woven fabric that is oriented at approximately a 45-degree angle to the spar axis.

An additional stack 503 is interleaved within stack 506. Stack 503 has individual layers 520-521, which comprise more layers of the 0/90 ply or on-axis woven fabric. Stack 506 may wrap completely around the spar (and around the mandrel during manufacture); however, stacks 503 and 504 extend only partially around the spar. The spar design may require localized stacks 503 and 504 to create a particular shape, thickness, curvature, or flexibility, for example, in area 522 of the spar. Although stacks 503 and 504 are shown as being interleaved within stack 506, it will be further understood that in other embodiments the localized stacks may be positioned between stacks of the same or different materials as well as within stacks of the same or different material.

FIG. 6 is a cutaway side view 600 of spar 401 as shown in FIG. 4. FIG. 6 further illustrates the fabric fibers within the various stacks of fabric. A first or inner-most fabric layer stack 601, which would have been laid up on the mandrel during manufacture, is comprised of layers of a 0/90 ply fabric. A second fabric layer stack 602 is wrapped around the first stack 601 and is comprised of layers of a −45/45 ply fabric. A third fabric layer stack 603 is wrapped around the second stack 602 and is comprised of more layers of the 0/90 ply fabric. Finally, a fourth fabric layer stack 604 is wrapped around the third stack 603 and is comprised of more layers of the −45/45 ply fabric. Again, the use of −45/45 ply fabric in stacks 602 and 604 is merely for illustration, and it will be understood that any off-axis fabric layers may be used within those stacks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for manufacturing a tubular composite structure, comprising:
 circumferentially laying up a first stack of a plurality of composite fabric layers all the way around a mandrel, wherein the layers in the first stack comprise a woven fabric having a first axis of orientation;
 laying up a second stack of composite fabric layers partially around the first stack after the first stack has been laid up around the mandrel, wherein the layers in the second stack comprise a woven fabric having a second axis of orientation, wherein the first axis of orientation is different than the second axis of orientation;
 laying up additional stacks of composite fabric on top of the first and second stacks and around the mandrel, wherein the additional stacks comprise fabric having the first axis of orientation alternating with stacks having the second axis of orientation; and
 curing the first, second, and additional stacks of composite fabric layers to form the tubular composite structure.

2. The method of claim 1, further comprising:
 laying up limited stacks of composite fabric interleaved with the additional stacks of composite fabric, wherein the limited stacks of composite fabric wrap partially around the mandrel.

3. The method of claim 1, wherein the tubular composite structure forms a spar for an aerodynamic component.

4. The method of claim 1, wherein the composite fabric comprises one or more of carbon and fiberglass composite materials.

5. The method of claim 1, wherein the woven fabric having the first axis of orientation and the woven fabric having the second axis of orientation comprise the same composite material.

6. The method of claim 1, wherein the woven fabric having the first axis of orientation comprises a first set of fibers oriented in a first direction, and a second set of fibers oriented generally orthogonal to the first direction.

7. The method of claim 6, wherein the woven fabric having the second axis of orientation comprises a third set of fibers that are oriented at an angle relative to the first set of fibers in the woven fabric having the first axis of orientation, and the woven fabric having the second axis of orientation further comprises a fourth set of fibers oriented generally orthogonal to the third set of fibers.

8. The method of claim 7, wherein the angle is selected from 15-degrees to 75 degrees.

9. The method of claim 1, wherein the tubular composite structure has a spanwise axis, and wherein the woven fabric having the first axis of orientation comprises a first set of fibers oriented generally parallel to the spanwise axis, and a second set of fibers oriented generally orthogonal to the spanwise axis, and wherein the woven fabric having the second axis of orientation comprises a third set of fibers oriented at angle of 15-degrees to 75-degrees relative to the spanwise axis, and the woven fabric having the second axis of orientation comprises a fourth set of fibers oriented generally orthogonal to the third set of fibers.

10. A method for manufacturing a tubular composite structure, comprising:
 circumferentially laying up a first stack of a plurality of composite fabric layers all the way around a mandrel, wherein the layers in the first stack comprise a woven fabric comprising a first axis of orientation including at least one of an on-axis orientation and an off-axis orientation;
 laying up a second stack of composite fabric layers partially around the first stack after the first stack has been laid up around the mandrel, wherein the layers in the second stack comprise a woven fabric with a second axis of orientation including at least one of the on-axis orientation and the off-axis orientation, wherein the second axis of orientation of the second stack is different than the first axis of orientation;
 laying up additional stacks of composite fabric on top of the first and second stacks and around the mandrel, wherein the additional stacks comprise fabric having the first axis of orientation alternating with stacks having the second axis of orientation; and
 curing the first, second, and additional stacks of composite fabric layers to form the tubular composite structure.

11. The method of claim 10, further comprising:
laying up limited stacks of composite fabric interleaved with the additional stacks of composite fabric, wherein the limited stacks of composite fabric wrap partially around the mandrel.

12. The method of claim 10, wherein the tubular composite structure forms a spar for an aerodynamic component.

13. The method of claim 10, wherein the composite fabric comprises one or more of carbon and fiberglass composite materials.

14. The method of claim 10, wherein the woven fabric having the first axis of orientation and the woven fabric having the second axis of orientation comprise the same composite material.

15. The method of claim 10, wherein the woven fabric having the first axis of orientation comprises a first set of fibers oriented in a first direction, and a second set of fibers oriented generally orthogonal to the first direction.

16. The method of claim 15, wherein the woven fabric having the second axis of orientation comprises a third set of fibers that are oriented at an angle relative to the first set of fibers in the woven fabric having the first axis of orientation, and the woven fabric having the second axis of orientation further comprises a fourth set of fibers oriented generally orthogonal to the third set of fibers.

17. The method of claim 16, wherein the angle is selected from 15-degrees to 75 degrees.

18. The method of claim 10, wherein the tubular composite structure has a spanwise axis, and wherein the woven fabric having the first axis of orientation comprises a first set of fibers oriented generally parallel to the spanwise axis, and a second set of fibers oriented generally orthogonal to the spanwise axis, and wherein the woven fabric having the second axis of orientation comprises a third set of fibers oriented at angle of 15-degrees to 75-degrees relative to the spanwise axis, and the woven fabric having the second axis of orientation comprises a fourth set of fibers oriented generally orthogonal to the third set of fibers.

\* \* \* \* \*